United States Patent [19]

Jacob

[11] Patent Number: 4,818,920

[45] Date of Patent: Apr. 4, 1989

[54] DIGITAL OEM CEILING FAN

[76] Inventor: Keith D. Jacob, 2321 S. Circle Dr., Ann Arbor, Mich. 48013

[21] Appl. No.: 112,614

[22] Filed: Oct. 26, 1987

[51] Int. Cl.[4] ............................................ H04Q 7/02

[52] U.S. Cl. ................................ 318/16; 340/825.57; 367/197

[58] Field of Search .................. 318/16, 480; 417/572; 340/825.57, 825.62, 825.69; 367/197, 199; 307/113, 117; 315/158

[56] References Cited

U.S. PATENT DOCUMENTS 4,355,309 10/1982 Hughey et al. ................. 367/197 X
4,371,814 2/1983 Hannas ................................. 318/16
4,385,296 5/1983 Tsubaki et al. ............ 340/825.69 X
4,538,973 9/1985 Angott et al. .................. 340/696 X
4,621,992 11/1986 Angott ............................ 361/399 X
4,684,822 8/1987 Angott ............................ 315/158 X

FOREIGN PATENT DOCUMENTS 2171545 8/1986 United Kingdom ........... 340/825.69

OTHER PUBLICATIONS

"Radio Control for Remote Operation of Electrical Equipment", Class 6610, Square D Company.

*Primary Examiner*—Bentsu Ro
*Attorney, Agent, or Firm*—Reising, Ethington, Barnard, Perry & Milton

[57] ABSTRACT

The invention is a remotely controlled ceiling fan and light assembly. Control of the assembly is accomplished by a transmitter (22) having a motor control button (26) and a light control button (24) to be depressed to control the fan (14) and light (18) on the assembly respectively. The motor control button (26) may be depressed for an extended time to reverse the direction of the fan (14). The transmitter (22) transmits a digitally coded radio signal wherein the coding is consumer selectable through switches. The receiver (20) on the fan and light assembly decodes (44) the pulses to ensure proper detection thereof. The eighth pulse of the radio coded signals indicates whether motor (16) or light (18) control is required. The receiver (20) includes a light control circuit (58) and motor control circuit (60) responsive to the decoded signal to control illumination of the light (18) and rotational speed and direction of the motor (16), respectively.

19 Claims, 2 Drawing Sheets

DIGITAL OEM CEILING FAN

TECHNICAL FIELD

The subject invention relates to an air-circulating fan assembly 10 including a rotating fan and a light which are remotely controllable.

BACKGROUND OF THE INVENTION

It is often desirable to mount a ceiling fan in a completed room. However, problems arise if wires have not been run between the location of the ceiling fan and a wall switch. Therefore, remotely controllable ceiling fans are used so that the walls need not be reconstructed to run wires.

One type of ceiling fan is a ceiling mounted fan and light assembly remotely controlled by radio signals having two channels to control the fan and light remotely to drive the motor and light at different levels setting the rotation speed of the fan and illumination of the light. Such an assembly is disclosed in U.S. Pat. No. 4,621,992 granted Nov. 11, 1986 in the name of Paul G. Angott, and assigned to the assignee of the subject invention. The patent discloses a ceiling fan which receives a dual channel signal from a remote transmitter having a fan control button and a light control button, wherein sequential depression of the buttons increments counters within the fan and light control to change the level speed of rotation and illumination, respectively. The problem with this type of assembly is that frequencies of the dual channel signal is fixed, and if control of more than one ceiling fan if desired, the electronics must be replaced.

Another type of remotely controlled ceiling fan assembly includes an infrared transmitter and a control circuit on the ceiling fan to regulate the speed of a ceiling fan, and reverse the direction of the ceiling fan, and control a light on or off. The infrared transmitter is directive so that a single receiver may be controlled without actuating additional receivers. Such an assembly is disclosed in U.S. Pat. No. 4,371,814 granted Feb. 1, 1983 in the name of Hannas and assigned to Silent Running Corporation. This patent discloses a transmitter which includes three buttons: a first for controlling the on/off and speed of the fan motor, a second for controlling the illumination of the light, and a third for controlling the forward or reverse directions of the fan. The receiver includes a decoder for receiving the pulse modulated signal from the transmitter and producing a one of three signals: a reverse signal, a light signal indicating on or off, and a motor speed signal which is incremented on consecutive receptions. A counter receives the motor speed signal to count and control three available speeds for the motor. The problem with this type of assembly is that the light can be only illuminated on or off, and that the transmitter is directive such that control of the fan assembly 10 must be exact with respect to the transmitter to ensure signals are received.

Additionally, a ceiling fan designed and manufactured by the assignee of the subject invention uses a transmitter for transmitting dual tone radio signals to a receiver which controls the fan and light assembly. The transmitter includes two buttons for light control and motor control. The motor control button controls the speed of rotation of the fan motor and controls the direction of rotation of the motor by extended actuation of the button. The receiver distinguishes the frequencies of the transmitted dual tone signal by high and low frequency detector circuits to determine whether light or fan control is requested. The motor control is accomplished by using a flip-flop and by using AND gates receiving the outputs of the flip-flop for decoding to control the fan at one of three available speeds.

The problems with this type of system is the limited control of multiple fan assemblies without replacement of electronics due to the fixed frequency transmitted between transmitter and receiver.

SUMMARY OF THE INVENTION

The invention is remote control fan assembly connected to an electrical power outlet which comprises an air circulating means, an electrical motor means for driving the air circulating means, and an electrical light means for selectively providing illumination. A radio signal receiver means is electrically connected to the motor means and the light means and is adapted for electrical connection to the electrical power outlet for controlling the power supply to the motor means and the light means independently of one another in response to first and second radio coded signals. The receiver means includes pulse decoding means for receiving the radio coded signals comprising a series of pulses representing bits and comparing the bits to a predetermined light code and a predetermined motor code to produce a light control signal and a motor control signal respectively. A light control means receives the light control signal to turn the light means on and off and establish the degree of illumination of the light means. The motor control means receives the motor control signal to establish the speed of rotation of the motor means.

Also included is a remote control means for transmitting radio coded signals to control the light means and motor means. The remote control means includes light switch means to be manually actuated for transmitting a light coded signal to illuminate the light means and motor switch means to be made manually actuated for transmitting a motor coded signal to control the signal to control the speed of the motor means and a extended motor coded signal to reverse the motor means 16.

The advantage of this type of assembly is that a plurality of fan assemblies and remote control means may be used without interfering with one another. Additionally, a simpler electronic transmitter is advantageous.

DESCRIPTION OF THE DRAWINGS

Other advantages of the present invention will be readily appreciated as the same becomes better understood by reference to the following detailed description when considered in connection with the accompanied drawings wherein.

DESCRIPTION OF THE PREFERRED EMBODIMENT

Figure 1:
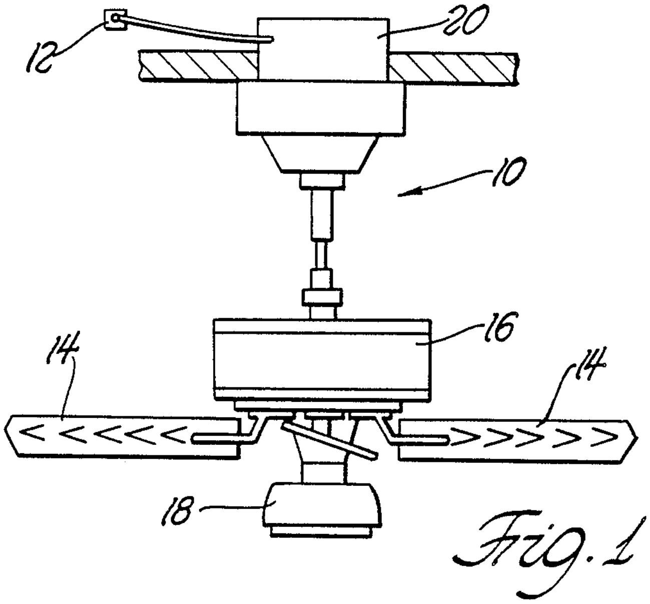
FIG. 1 is a perspective view of the subject invention.

A remote control fan assembly is generally shown at 10 in FIG. 1 and is connected to an electrical power outlet 12. The fan assembly 10 includes air circulating means 14, such as fan blades for rotation. An electrical motor means 16 is to be connected to the electrical power outlet 12 for driving and rotating the air circulating means 14. An electrical light means is to be connected to the electrical power outlet 12 for selectively providing illumination. The electrical light means 18 may include one or a plurality of light bulbs secured to the fan assembly 10. The fan assembly 10 includes a radio signal receiver means 20 electrically connected to the motor means 16 and the light means 18 and adapted for electrical connection to the electrical power outlet 12 for controlling the power supplied to the motor means 16 and the light means independently of one another in response to motor and light radio coded signals. Also included is remote control means 22 for transmitting radio coded signals for operating the radio signal receiver means 20 to control the light means 18 and the motor means 16.

The remote control means 22 includes a light switching means 24 to be manually actuated for transmitting a light radio coded signal to control illumination the light means 18 of the fan assembly 10. Therefore, actuation of the light switching means 24 will turn ON and OFF the light 18, and prolonged actuation will increase illumination of the light and turn OFF the light. A motor switching means 26 is manually actuatable for transmitting a motor radio coded signal to control the speed of the motor means 16 and for transmitting an extended motor coded signal to reverse or change direction of the motor means 16. Therefore, sequential operation of the motor switching means 26 will turn ON the motor 16 and increase the speed and turn OFF the motor 16.

Figure 2:
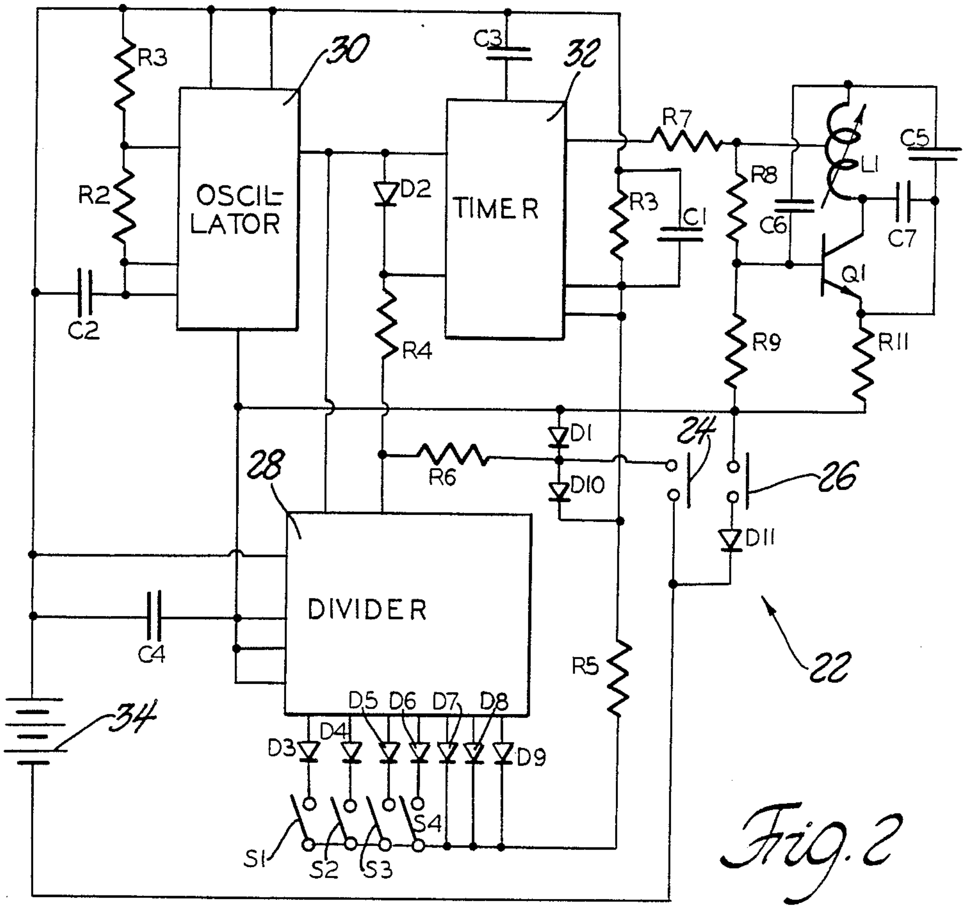
FIG. 2 is a circuit diagram of a remote control means of the subject invention.
Figure 3:
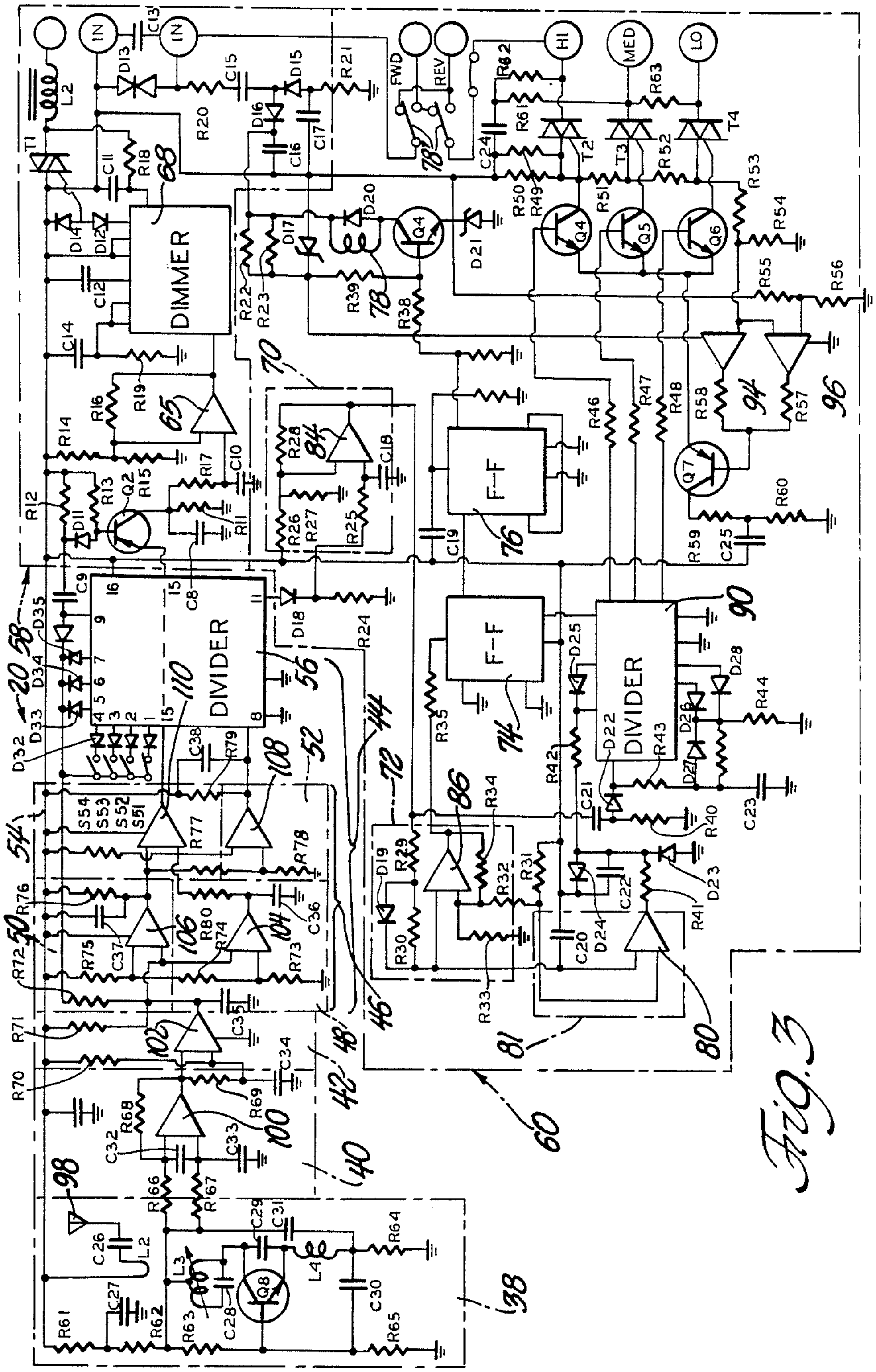
FIG. 3 is a circuit diagram of the radio signal receiver means of the subject invention.

In the actual implementation of the remote control means 22, an encoder means 28 is included for producing the pulse coding of the light radio coded signal and the motor radio coded signal. The encoder means 28 includes consumer selectable switches S1–S4 to be switched to determine the coding of the light and motor radio coded signals. The coded signals comprise a series of coded pulses. In the preferred embodiment, ten pulses are used per transmitted radio coded signal, but any number may be used. The eighth pulse is the data pulse distinguishing the light coded signal from the motor coded signal and vice versa. The remote control means 22 includes oscillator means 30 to produce the timing for the transmission of the radio coded signals. The encoder means 28 receives the frequency from the oscillator means 30 and divides by a predetermined number, such as 10 in the preferred embodiment. The predetermined divide number is representative of the number of pulses which will be transmitted per word for the light and motor coded signals. A timer means 32 generates the pulses representative of the coding. The timer means 32 receives the state of the pulses at its discharge pin 13 and threshold pin 12 inputs. The encoder means 28 provide the state of the pulses, wherein the consumer selectable switches are attached to the pulses 0 (pin 3), 1 (pin 2), 2 (pin 4), 3 (pin 7), 5 (pin 1), 6 (pin 5) and 7 (pin 6). The remaining pulses 9 (pin 11), and 4 (pin 10) are left open which are merely for examples and may be connected in a plurality of different ways. As indicated in FIG. 2, the 0–7, 9 pulses may be connected or disconnected depending upon the coding desired, and the eighth pulse being used as the data of pulse. When the light switching means 24 is depressed, a battery 34 is turned on by grounding through diode D1. When the battery 34 is connected, the 8th pulse is grounded and a wide pulse is generated to a transmitting circuit 36 which will represent 0 for the eighth data pulse. When the motor switching means 26 is depressed, a narrow pulse will be generated at the eighth pulse. A capacitor C1 is discharged through resistor R1 producing narrow pulses for the 0–7 pulses when connected to the encoder means 28. The oscillator means 30 includes a capacitor C2 connected to the battery 34 and to pin 6 as the trigger input, a resistor R2 connected to pin 6, pin 2 (threshold input) and to pin 1 (discharge). A resistor R3 is connected between the battery 34 and pin 1. Pins 4 and 14 are also connected to the battery 34. Pin 7 (ground) is connected to pins 15, 13 and 18 of the encoder means 28. Pin 5 (output) is connected to pin 10 (reset) of the timer means 32. The timer means 32 includes a diode D2 connected between pin 10 and 8 (trigger), and a resistor R4 connected to pin 8 and pin 9 (data bit) of the encoder means 28. Pin 11 is connected to capacitor C3 to a transmitter means for transmitting the coded radio signals. The parallel resistor R1 and capacitor C1 are connected to the battery 34 and to pins 13 (discharge) and 12 (threshold). The encoder means 28 includes pin 16 connected to the battery 34. Pins 1–7 are data bits and connected through diodes D3–9 to the consumer selectable switches S1–4; pins 5, 6, 7 may also be connected to switches. Pins 10–12 are open, but pins 10 and 11 may also be connected to switches and diodes. The diodes D3–9 are connected through resistor R5 to pins 12, 13. The diode D1 is connected to ground and the light switching means, and a diode D10 is connected to the light switching means 24 and pin 12 of the timer means 32. A resistor R6 is connected between pin 9 of the encoder means and the light switching means. The motor switching means 26 is connected through diode D11 to the battery 34 and to ground. Capacitor C4 is connected to the reset pin 15 of the encoder means to the battery 34. The transmitting circuit 36 includes resistor R7 receiving the output pin 9 of the timer means 32 and connected to resistor R8 to resistor R9 to ground. Resistor R7 taps oscillating coil L1 with one side connected to capacitor C5 and capacitor C6. Capacitor C5 is connected to capacitor C7 to the other side of the coil L1. Capacitor C6 is connected to a transistor Q1, the base connected to the capacitor C6 and resistor R8. The emitter of the transistor Q1 is connected to ground through resistor R10.

As previously discussed, the radio coded signals include 10 pulses or bits to be coded. The eighth pulse is the data pulse distinguishing the light coded radio signal from the fan coded radio signal. Each pulse or bit is wide or narrow representing 0 or 1 digitally.

The radio signal receiver means 20 includes a radio detector circuit 38 for receiving the transmitted radio coded signals from the remote control means 22. An audio amplifier 40 receives the detected signal and amplifies the signal producing an amplified signal. A limiter 42 receives the amplified signal producing a coded signal. The radio signal receiver means 20 also includes pulse decoding means 44 for receiving the radio coded signals comprising the series of pulses and comparing the pulses to a predetermined light code and a predetermined motor code to produce a light control signal and a motor control signal respectively. The pulse decoding means 44 includes pulse orientation means 46 for ensuring that the received coded signals are the motor and light coded signals having the proper timing and pulse width. The pulse orientation means 46 includes first width detector means 48 for allowing the coded signals to pass when the pulses are wide than a first predetermined width. A second width detector means 50 prevents the radio coded signals to pass when the pulses are wider than a second predetermined width. A first separation detector means 52 allows the coded signals to pass when the separation between the pulses is greater than a first predetermined separation. A second separation detector means 54 prevents the coded signals to pass when the separation between the pulses is greater than a second predetermined separation. The pulse decoding means 44 includes a digital decoding means 56 for receiving the coded signals from the pulse orientation means 46. Coded signals which pass through the first and second width detector means 50 and the second separation detector means 54 produce a motor control signal and a light control signal. A reset signal is produced by the pulse orientation means 46 when the coded signals are prevented to pass through the first and second width detector means 50 and the second separation detector means 54 preventing the production of the motor control signal and the light control signal. The digital decoder means includes consumer selectable switches SS1-4 to set the coding for detection of the coded signals. These consumer selectable switches SS1-4 need be set in the same coding as the remote control means 22. The digital decoding means 56 produces the light control signals and a fan control signals as long as the proper coding is detected, and the coding of the 8th bit is determinitive whether the light control signal or the fan control signal will be produced.

The radio signal receiver means 20 includes light control means 58 for receiving a light control signal from the digital decoding means 56 to turn the light means 18 on and off and establish the degree of illumination of the light means. A motor control means 60 receives the motor control signal from the digital decoding means 56 to establish the direction and the speed of rotation of the motor means 16.

The light control means 58 includes a gate 62 receiving the light control signal which is then sent to an RC filter comprising resistor R11 and capacitor C8. The gate 62 receives the reset pin 15 and the data pulse 8 on pin 9. Capacitor C9 is connected to pin 9 and to resistor R12 to power and to diode D11 to the base of the transistor Q2, acting as the gate 62, and to resistor R13 to power. The emitter of transistor Q2 is connected to pin 15. A dimmer circuit 64 receives the filtered signal to control the illumination of the light 18. Control and disclosure of the dimmer circuit is the same as U.S. application Ser. No. 860,300, restated here. The dimmer circuit 64 includes a threshold detector 66 which receives the signal from the RC filter R11, C8 to ensure that the magnitude of the signal is within the predetermined range for driving the phase firing of the power to the load or light means. The threshold detector includes an operational amplifier 67 biased by two resistors R14, R15 with non-inverting feedback through resistor R16. The inverting input is connected through resistor R17 to the resistor R11 and capacitor C8 of the RC filter, and to capacitor C10 to ground. A dimmer chip 68 receives the signal from the threshold detector 66. The dimmer chip 68 includes a triac T1. The dimmer chip 68 acts as a counter reacting from the duration of the signal coming from the threshold detector 66 which counts based on time intervals which establishes the phase of firing of the triac T1 to illuminate the light means to the requested lighting condition. A diode D12 is connected between the chip 68 at pin 8 and the triac T1 to illuminate the light or load to the proper dimming condition. A power supply circuit for the dimmer chip 68 is connected between the dimmer circuit 64 and the power leads for supplying power to the circuit and to the light or load through the dimmer chip 68. The power supply circuit includes a resistor R18 and a capacitor C11 interconnect the power output and dimmer chip 68 for a counter reset. A capacitor C12 connects to the dimmer chip 68 to prevent triggering. A capacitor C13 interconnects the power input to prevent shorting. A blocking diode D13 interconnects the power input leads to protect the circuit against voltage surfaces from a constant power source. A diode D14 is connected between power and the gate of triac T1. The output of triac T1 is connected to inductor L2 to control the light means. A capacitor C14 is connected to power and pins 6 and 7 of the dimmer chip 68, and connected to resistor R19 to ground. Resistor R20 is connected to the negative power input, to capacitor C15 to diode D15 and reverse biased diode D16. Resistor R21 is connected to diode D16 and ground, and diode D16 is connected to capacitor C16 and power. Capacitor C17 is connected to diode D15 and to zener diode D17. Parallel resistors R22, R23 are connected to zener diode D17 and to diode D16. Thus, a first duration, typically less than on second, of the radio frequency signal will energize the counter circuit by making the dimmer chip 68 fire a gate pulse to the triac causing the triac to conduct. The dimmer chip 68 will hold the previous power magnitude level in memory. So, once the counter circuit is energized, a longer duration of the radio frequency signal will cause the counter circuit to count up or down and increase or decrease the amount of power supplied to the light or load. Another short duration pulse will deenergize the counter circuit and cut the power to the light 18 or load.

The motor control means 60 includes a motor threshold detector 70 receiving the motor control signal from the digital decoding means 58 which will be activated when the 8th pulse is narrow. A direction means 72 receives the signal and, if the motor switching means 26 is depressed for more than 4 seconds, the motor 16 will be reversed. A directional amplifying means 74 receives the signal from the direction means 72 for amplification. The motor control means 60 includes toggle means 76 for setting the motor means 16 in the forward and reverse direction. The toggle means 76 receives a signal from the directional amplifying means 74 which controls a relay 78 in the motor setting the direction. The relay 78 controls a switch 78, which will have a normally "open" position such as forward, whereupon energization of the relay 78 will switch the switch 78, to the other direction, i.e. reverse. A comparator means 80 also receives the fan control signal from the motor threshold detector 70 for slowing the motor means 16 prior to the actuation of the direction means 72. The comparator means 80 will reset the divider means 82 after a predetermined time, such as 2 seconds, when the motor is to change directions. This will allow the fan to slow down before changing direction eliminating wear on the motor 16. A divider means 82 receives the signal from the comparator means 80 to set the motor 16 in the plurality of rotational speeds.

In regard to the actual implementation of the motor control means 60, a blocking diode D18 is connected to pin 8 of the digital decoding means 56 to prevent a voltage being applied thereto from the motor control means 60. The motor threshold detector 70 means includes a resistor R24 grounded connected to the blocking diode D18, a resistor R25 connected between the blocking diode D18 and inverting input if an operational amplifier 84 and a capacitor C18 grounded also connected to the inverting input. The non-inverting input of the operational amplifier 84 is connected to a resistive divider circuit R26, R27 to power and to a feedback resistor R28. The direction means 72 receives the output of the operational amplifier 84 of the motor threshold detector 90 by a resistor R29 connected to a resistor R30 and diode D19 in parallel which are connected to the inverting input of an operational amplifier 86. The non-inverting input is connected to a voltage divider R31, R32 to power and a resistor R33 to ground with a feedback resistor R34. The directional amplifying means 74 is configured as a D-flip-flop. The flip-flop 74 receives its input signal from the operational amplifier 86 through resistor R35 at its select input pin 8. The clock pin 11 and D pin 9 inputs are connected to ground and the reset pin 10 is high. The toggle means 76, also configured as a D flip-flop, receives the clock input pin 3 from the Q output of the directional amplifying means 74. The D input is pin 5 connected to the inverted Q output, and the select input is connected to power through capacitor C19 and to ground through resistor R36. The output at Q is connected to the reversing relay 78. The reversing relay 78 includes a resistor R37 to ground receiving the Q output of the toggle means 76. A base biasing resistor R38 is also connected to the Q output which biases a transistor Q3 and connected through resistor R39 to diode D17; the transistor Q3 drives the relay 78 R1 in parallel with diode D20 through its collector. The relay 78 controls a switch 78' connected to forward and reverse terminals of the motor means 16. The emitter of the transistor Q3 is connected to a zener diode D21.

The comparator means 80 receives its input signal from the parallel diode D19-resistor R30 circuit of the direction means 72 at the inverting input of an operational amplifier 88. A capacitor C20 is also connected to the operational amplifier 88 and power. The non-inverting input is connected to the voltage divider R32, R31.

The divider means 82 receives its input from the motor threshold detector 70 through capacitor C21 connected to resistor R40 to ground and through diode D22 to pin 14 (clock) of a divider chip 90. The output of the comparator means 80 controls the reset of the divider chip 90: the output of operational amplifier 88 is sent through resistor R41 to a diode D23 to ground and to resistor R42 to pin 15 (reset) and to reversed diode D25 to pin 5 (count 6). A parallel capacitor C22 and diode D24 are connected between power and resistor R41. The output pin 2 (count is connected to a first speed, output pin 7 (count 3) is connected to a second speed, and output pin 1 (count 5) is connected to a third speed for motor control. The output pin 4 (count 2) is connected through a time delay circuit 92 to the input pin 14 to retrigger the divider chip 90, as is pin 18 (count 4). Therefore, upon first reception of a short motor control signal, the divider chip 90 will be incremented to count 1 turning the motor on a first speed. Upon a second reception of a motor control input signal, the divider chip 90 will be incremented to count 2 which produces an output on pin 4 to be delayed through the delay circuit 92 and produces a third input signal on the input pin 14 incrementing the counter to count 3 stepping the motor to the second speed. When a fourth signal is received on the input divider chip 90 is incremented to count 4 which goes through the delay circuit 92 to the input triggering count 5 and the third speed. Upon a subsequent reception of a motor control signal, the divider chip 90 will increment to count 6 which will rest the divider chip 90 through diode D25, and the process repeats. The delay circuit 92 includes diode D26 at pin 4 count 2 connected to reverse biased diode D27, diode D26 is connected to resistor R44 to ground, and resistor R45 to capacitor C23 to ground, resistor R45 connected to resistor R43 to input pin 14. Diode D28 is connected to count 4 pin 18 to resistor R45.

The output pins 2, 7, 1 (counts 1, 3, 5) control through three base resistors R46, R47, R48 and three transistors Q4, Q5, Q6 respectively. The transistors Q4, Q5, Q6 control triacs T2, T3, T4 powered by resistive voltage dividers R49, R50, R51, R52 setting the power level for each triac to be connected to the motor. Capacitor C24 is connected to power and to resistor R62 to the first power output, and to resistor R61 to the second power output to resistor R63 to the third power output.

An operational amplifier 94 has its inverting input connected to power and resistor R55 to resistor R56 to ground. Its non-inverting input is connected to resistor R54 to ground, and to resistor R53 to resistor R52. Operational amplifier 96 has its inverting input connected to the non-inverting input of operational amplifier 94, and its non-inverting input to resistors R55 and R56. The output of operational amplifiers 94 and 96 are connected to resistor R58 and R57, respectively, connected to the base of transistor Q7. Transistor Q7 has its emitter connected to the emitters of transistors Q4, Q5, Q6 controlling motor speed, and its collector connected to resistor R59 to resistor R60 to ground, and to capacitor C25 to power.

The radio detector circuit 38 includes a radio receiver including antenna 98 to receive the first and second radio coded signals. The antenna 98 is connected to a capacitor C26 to and inductor L2 to the power line. A resistor R61 is connected to the power line connected to a capacitor C27 to ground and connected to a resistor R62. The coil L2 is coupled to a coil L3 for receiving the radio signals from the remote control means 22. The coil L3 is in parallel with a capacitor C28 tapped by resistor R62. This resistor R62 is connected to a base resistor R63 driving the base of transistor Q8 which has its emitter and collector connected through capacitor C29. The collector is connected to the coil L3 and capacitor C28. The emitter is connected through coil L4 to resistor R64 to ground. The base of the transistor Q8 is connected to a resistor R65 to ground and to capacitor C30 between the base and the coil L4. A capacitor C31 is connected to the resistor R64 and to the coil L3. The audio amplifier 40 includes a resistor R66 connected to the tapped point of the coil L3 and connected to the inverting input of an operational amplifier 100. A resistor R67 is also connected to the tapped coil L3 and to the non-inverting input, a capacitor C32 is connected between the inverting and non-inverting inputs, and capacitor C33 is connected to the non-inverting input to ground. Also included is a feedback resistor R68 connected to the inverting input. The limiter 42 includes an operational amplifier 102 receiving its input and the non-inverting input from the operational amplifier 100 of the audio amplifier 40 means. The input is also connected to resistor R69 to capacitor C34 to ground. The inverting input of the operational amplifier is connected between resistor R69 and capacitor C34 and to resistor R70 to power. The output of the limiter means 42 will be normally low without any input signal. The first width detector means 48 is connected to the output of the limiter means 42 and connected to capacitor C35 to ground and to resistor R71 to power and to resistor R72 to the digital decoding means 56. The pulse on the output of the limiter means 42 charges capacitor C35 through resistor R71 or resistor R72. An operational amplifier 104 has its inverting input connected to the output of the limiter means 42, and a non-inverting input connected to a voltage divider comprising resistors R73 connected to ground and resistor R74 connected through resistor R75 to power. The output of the operational amplifier 104 is connected to capacitor C36 to ground to be charged when the first predetermined width is exceeded. The second width detector means 50 includes an operational amplifier 106 which receives the inverting input from the limiter means 42 and its non-inverting input from resistor R75 to power. The output of the operational amplifier 106 is connected to resistor R76 to power and capacitor C37 to power acting as a filter. The first separation detector means 52 includes and operational amplifier 108 receiving at its non-inverting input power through resistor R77, and a voltage divider R78, R79 connected to the output of the second width detector means 50 and ground. The output of first separation detector means 52 is connected to a filter R79, C38 to pin 14 of the digital decoder means. The second separation detector means 54 includes an operational amplifier 110 receiving the output of the second width detector means 50 at its inverting input, and the output of the first width detector means 48 at its non-inverting input through resistor R80 the output of which triggers the reset. The digital decoding means 56 includes four consumer selectable switches connected at pins 2, 3 and 4, to switches connected through diodes D29-32. Pins 5, 6 and 7 are connected through diodes D33-35 to the output of the limiter means 42. As stated in regard to the remote control means 22, the pulse codings may be varied. Pins 5, 6 and 7 may also be connected to switches.

By way of example, and certainly not by way of limitation, the preferred embodiment of the circuit illustrated may include the following components:

LIST OF COMPONENTS

| Resistors | Value (Ohms) |
|---|---|
| R2, R3 | 576k |
| R4, R44 | 47k |
| R1, R5, R6, R71, R72 | 97.6k |
| R8, R57, R58 | 22k |
| R7, R10, R60, R61, R62 | 1k |
| R9, R29, R32, R38, R46, R47 | 10k |
| R48, R62, R63, R66, R67, R69 | |
| R78 | |
| R61 | 10 |
| R65 | 3.3k |
| R16, R19, R64 | 470k |
| R11, R13, R17, R18, R35, R40 | 1 m |
| R43, R68, R70, R77, R78 | |
| R27, R75, R80 | 150k |
| R12, R14, R26, R28, R36, R41 | 100k |
| R45, R74 | |
| R73 | 348k |
| R76 | 360k |
| R80 | 430k |
| R15, R33, R37 | 39k |
| R24 | 6.8 M |
| R25 | 200k |
| R30, R34 | 220k |
| R31 | 56k |
| R21, R59 | 270k |
| R55 | 360k |
| R54, R56 | 68k |
| R53 | 180k |
| R49, R50, R52 | 1 |
| R63 | 82k |

-continued

LIST OF COMPONENTS

| | |
|---|---|
| R51 | 0 |
| R39 | 12k |
| R22, R23 | 12k |
| R20 | 39 |
| **Capacitors** | **Values (Farads)** |
| C4, C14, C19, C20 | 10 u |
| C1, C2, C35, C36 | 4.7 n |
| C3 | 10 n |
| C6 | 2-2.5 p |
| C5, C7 | 7 p |
| C26 | 100-560 p |
| C16, C17, C25, C27 | 100 u |
| C28 | 3 p |
| C29 | 5 p |
| C22, C23, C33, C34 | 1 u |
| C9, C18, C37 | 22 n |
| C8, C10 | 100 n |
| C12 | 47 n |
| C11 | 470-560 p |
| C13, C24 | .1 u |
| C21 | 10 n |
| C15 | 1.5 u |
| **Diodes** | **Type** |
| D11, D13, D18, D22, D24 | 1N4148 |
| D25, D28 D1-D11, D29-D35, | |
| D12, D14, D15, D16, D20 | 1N4004 |
| D17, D21 | 1N4743A |
| **Transistors** | **Type** |
| Q1, Q8 | MPSH10 |
| Q2, Q7 | 2N3906 |
| Q3, Q4, Q5, Q6 | 2N3904 |
| Q5, Q6, Q7 | 2N4401 |
| **Integrated Circuits** | **Type** |
| 30, 32 | LM556 |
| 28, 56, 90 | CD4017 |
| 65, 84, 86, 88, 94, 96, | LM324 |
| 100, 110 | |
| 102, 104, 106, 108 | LM339 |
| 68 | LSI7232 |
| 74, 76 | CD4013BE |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals ar merely for convenience and are not to be in any way limiting, the invention may be practiced otherwise than as specifically described.

What is claimed is:

1. A remote control fan assembly for connection to an electrical power outlet (12), said assembly comprising; air circulating means (14), electrical motor means (16) for driving said air circulating means (14), radio signal receiver means (20) electrically connected to said motor means (16) and adapted for electrical connection to the electrical power outlet (12) for controlling the power supplied to said motor means (16) in response to a first radio signal, said receiver means (20) including motor control means for controlling the rotational speed of said motor means (16), said motor control means including divider means (82) for receiving and counting each received first radio signal to turn ON and OFF and change the speed of rotation of said motor means (16), said divider means (82) including a divider chip means (90) for receiving said first radio signal and including a delay circuit (92) for delaying the change of speeds between counts and producing an input signal for said divider chip (90) so that said motor means (16) is controlled at a first rotational speed by count one upon a reception of a first motor control signal, said motor means (16) is controlled at a second rotational speed by count two upon a second motor control signal received by said delay circuit (92) for incrementing said divider chip means (90) to count three after said delay (92), said motor means (16) is controlled at a third rotational speed by count four upon a third motor control signal received by said delay circuit (92) incrementing said divider chip means (90) to count five after said delay, and said motor means (16) is turned off upon a fourth motor control signal received by said divider chip means (90) to be reset by a count six.

2. A remote controlled fan assembly (10) for connection to an electrical power outlet (12), said assembly comprising; air circulating means (14), electrical motor means (16) for driving said air circulating means (14), electrical light means for selectively providing an illumination, radio signal receiver means (20) electrically connected to said motor means (16) and said light means and adapted for electrical connection to the electrical power outlet (12) for controlling the power supplied to said motor means (16) and said light means independently of one another in response to a first and a second radio coded signal, said receiver means including a pulse decoding means (44) for receiving said radio coded signals comprising a series of coded pulses and comparing said pulses to a predetermined light code and a predetermined motor code to produce a light control signal and a motor control signal, respectively, said pulse decoding means (44) including pulse orientation means (46) for detecting said radio coded signals having a predetermined pulse width and pulse separation, said pulse orientation means including width detector means for allowing said radio coded signals to pass when said pulses have a width within a predetermined width range and separation detector means for allowing said radio coded signal to pass when said pulses have a separation within a predetermined separation range, and digital decoding means (56) for receiving the detected radio coded signals from said pulse orientation means (46) and for comparing said coded pulses to a consumers selectable code comprise said predetermine light code and said predetermined motor code to produce said light control signal and said motor control signal when detached.

3. An assembly as set forth in claim 2 further characterized by said digital decoding means (56) including consumer selectable switches to set the coding of the pulses of said radio coded signals.

4. An assembly as set forth in claim 3 further characterized by said width detector means including first width detector means (48) for allowing said radio coded signal to pass when said pulses are wider than a first predetermined width.

5. An assembly as set forth in claim 4 further characterized by said width detector means including second width detector means (50) for preventing said radio coded signals to pass when said pulses are wider than a second predetermined width.

6. An assembly as set forth in claim 5 further characterized by said separation detector means including first separation detector means (52) for allowing said radio coded signals to pass when the separation between said pulses is greater than a first predetermined separation.

7. An assembly as set forth, in claim 6 further characterized by said separation detector means including second separation detector means (54) for preventing said radio coded signals to pass when the separation between said pulses is greater than a second predetermined separation.

8. An assembly as set forth in claim 2 further characterized by said receiver means (20) including light control means (58) for receiving said light control signal to establish the degree of illumination of said light means, and motor control means (60) for receiving said motor control signal to establish the rotation of said motor means (16).

9. An assembly as set forth in claim 8 further characterized by said motor control means (60) including direction means (72) for receiving an extended motor control signal and changing the direction of said motor means (16), and comparator means (80) for slowing said motor means (16) prior to the actuation of said direction means (72).

10. An assembly as set forth in claim 9 further characterized by said motor control means including divider means (82) responsive to said comparator means (80) and said digital decoding means (56) for counting each motor control signal and turning ON and OFF said motor means (16) and changing the speed of rotation of said motor means (16) and for receiving a reset signal from said comparator means (80) to turn off said motor means (16) prior to actuation of said direction means (72).

11. An assembly as set forth in claim 10 further characterized by said motor control means (60) including three speed settings for said motor means (16).

12. An assembly as set forth in claim 11 further characterized by said divider means (82) including a divider chip (90) having six counts for receiving said motor control signal as input signal from said pulse decoding means (44) and a signal from said comparator means (88) as reset, and including a delay circuit (92) for delaying the change of speeds between counts and producing said input signal of said divider chip (90) so that said motor means (16) is controlled at a first rotational speed, by count one upon a reception of a first motor control signal, said motor means (16) is controlled at a second rotational speed by count two upon a second motor control signal received by said delay circuit (92) for incrementing said divider chip (90) to count three after said delay (92), said motor means (16) is controlled at a third rotational speed by count four upon a third motor control signal received by said delay circuit (92) incrementing said divider chip (90) to count five after said delay and said motor means (16) is turned off upon a fourth motor control signal received by said divider chip (90) to be reset by a count six.

13. An assembly as set forth in claim 12 further characterized by said digital decoding means (56) for receiving said radio coded signals from a first separation detector means (52) to produce said motor control signal and said light control signal when said series of codes pulses is detected and for receiving a reset signal from a second separation detector means (52) to prevent the production of said motor control signal and said light control signal, and said digital decoding means (56) including consumer selectable switches to set the coding of the pulses of said radio coded signals.

14. An assembly as set forth in claim 13 further characterized by said width detector means (46) including first width detector means (48) for allowing said radio coded signals to pass when said pulses are wider than a first predetermined width.

15. An assembly as set forth in claim 14 further characterized by said width detector means including second width detector means (50) for preventing said radio coded signals to pass when said pulses are wider than a second predetermined width.

16. An assembly as set forth in claim 15 further characterized by said separation detector means including said said first separation detector means (52) for allowing said radio coded signals to pass when the separation between said pulses is greater than a first predetermined separation.

17. An assembly as set forth in claim 16 further characterized by said separation detector means including said second separation detector means (54) for preventing said coded radio signals to pass when the separation between said pulses is greater than a second predetermined separation.

18. A remote control fan assembly for connection to an electrical powered outlet (12), said assembly comprising; air circulating means (14), electrical motor means (16) for driving said air circulating means (14), radio signal receiver means (20) electrically connected to said motor means (16) and adapted for electrical connection to the electrical powered outlet (12) for controlling the power supply to said motor means (16) in response to a radio coded signal, said receiver means characterized by including pulse decoding means (44) for receiving said radio coded signal comprising a series of coded pulses and comparing said pulses to a predetermined motor code to produce a motor control signal, said pulse decoding means (44) including pulse orientation means (46) for detecting said radio coded signal having predetermined pulse widths and pulse separation, said pulse orientation means including width detector means for allowing said radio coded signal to pass when said pulses are within a predetermined width range and separation detector means for allowing said radio coded signal to pass when the separation between said pulses is within a predetermined separation range, and including consumer selectable switches to set the coding of a predetermined motor code and including digital decoding means (56) for receiving the detected radio coded signal from said pulse orientation means (46) and for comparing said coded pulses to said predetermined motor code to produce motor control signal when detected, and including motor control means (60) for receiving said motor control signal to establish the rotation of said motor means (16).

19. An assembly as set forth in claim 18 further characterized by said pulse orientation means (46) including first width detector means (48) for allowing said radio coded signal to pass when said pulses are wider than a first predetermined width, second width detector means (50) for preventing said radio coded signal to pass when said pulses are wider than a second predetermined width, first separation detector means (52) for allowing said radio coded signal to pass when the separation between said pulses is greater than a first predetermined separation, and second separation detector means (54) for preventing said radio coded signal to pass when the separation between said pulses is greater than a second predetermined separation.

* * * * *